United States Patent [19]

Chung et al.

[11] 3,856,862

[45] Dec. 24, 1974

[54] PROCESS FOR HYDROGENATION OF DI(4-AMINOPHENYL)METHANE WITH A RHODIUM CATALYST

[75] Inventors: Tae H. Chung, Wallingford, Conn.; Michael L. Dillon, Deer Park, Tex.; Gregory L. Lines, Prospect, Conn.

[73] Assignee: The Upjohn Company, Kalamazoo, Mich.

[22] Filed: June 25, 1973

[21] Appl. No.: 373,094

[52] U.S. Cl. .................. 260/563 B, 260/563 D
[51] Int. Cl. .................. C07c 85/00, C07c 87/32
[58] Field of Search .................. 260/563 B, 563 D

[56] References Cited
UNITED STATES PATENTS

| | | | |
|---|---|---|---|
| 3,194,839 | 7/1965 | Robinson et al. | 260/563 A |
| 3,196,179 | 7/1965 | Robinson et al. | 260/563 A |
| 3,347,917 | 10/1967 | Arthur | 260/563 D |
| 3,591,635 | 7/1971 | Farnissey et al. | 260/563 B |

*Primary Examiner*—Lewis Gotis
*Assistant Examiner*—D. R. Phillips
*Attorney, Agent, or Firm*—James S. Rose

[57] ABSTRACT

A process is disclosed for the catalytic hydrogenation of di(4-aminophenyl)methane to di(4-aminocyclohexyl)methane. The use of ammonia during the hydrogenation allows the rhodium catalyst to be used a plurality of times before regeneration becomes necessary. High yields of pure grade di(4-aminocyclohexyl)methane are obtained in a semi-continuous process by combining the use of ammonia during the hydrogenation with a catalyst rejuvenation step whenever it becomes necessary.

9 Claims, No Drawings

PROCESS FOR HYDROGENATION OF DI(4-AMINOPHENYL)METHANE WITH A RHODIUM CATALYST

BACKGROUND OF THE INVENTION

1. Field Of the Invention

This invention relates to the catalytic hydrogenation of polynuclear aromatic amines to the corresponding poly(cycloalkyl)amines and is more particularly concerned with the catalytic hydrogenation of di(4-aminophenyl)methane to di(4-aminocyclohexyl)methane in the presence of ammonia.

2. Description of the Prior Art

The catalytic hydrogenation of the nucleus of aromatic amines is well-known in the art. The process most commonly used at present in the catalytic hydrogenation of di(4-aminophenyl)methane to di(4-aminocyclohexyl)methane involves the use of supported and unsupported ruthenium catalysts; see, for example, U.S. Pat. Nos. 2,494,563, 2,606,924, and 2,606,928. This process is subject to a number of disadvantages including the slowness of reduction of the second phenyl nuclei which results in prolonged hydrogenation times. Also the ruthenium catalyst is generally not capable of reuse without a drastic recovery and rejuvenation procedure. These disadvantages have been obviated by the use of rhodium catalysis for the hydrogenation, see, for example, U.S. Pat. No. 3,591,635; and U.S. Pat. No. 3,071,551 for the recovery of rhodium catalysts. However, the present state of the art does not allow for a process whereby the catalyst can be used in a multiplicity of hydrogenations before catalyst rejuvenation becomes necessary nor does it allow for a facile semi-continuous process.

We have now found that the disadvantages of the prior art are overcome by carrying out the hydrogenation of di(4-aminophenyl)methane using a rhodium catalyst in the presence of ammonia. It is therefore an object of this invention to provide a method for hydrogenating di(4-aminophenyl)methane which allows for the continued reuse of the rhodium catalyst a plurality of times before regeneration becomes necessary. It is another object of this invention to provide a semi-continuous method for hydrogenating di(4-aminophenyl)methane. It is yet a further object of this invention to provide a simple and efficient means for rejuvenating the rhodium catalyst when it becomes necessary and which attainment flows directly from the use of ammonia during the hydrogenation because of low residue build-up on the catalyst. It is still yet a further object of this invention to provide a more economical process for the production of di(4-aminocyclohexyl)methane in high yield and in high purity which is made possible by the various aspects of the invention as set forth hereinbelow.

It is known in the art that the use of ammonia during the hydrogenation of aniline to inhibit the deamination of the aromatic amine, will also cause poisoning of a rhodium catalyst (see; "Catalytic Hydrogenation Over Platinum Metals" by Paul N. Rylander, Academic Press, New York, 1967, page 355). In the process of the present invention it has been found that the partial pressure of ammonia present during the hydrogenation enables the cycling of the same rhodium catalyst in an unexpectedly large number of runs before catalyst regeneration becomes necessary.

SUMMARY OF THE INVENTION

The invention consists of a process for the catalytic hydrogenation of di(4-aminophenyl)methane to di(4-amino-cyclohexyl)methane in the presence of a supported rhodium catalyst under a hydrogen pressure of from about 3 atmospheres to about 20 atmospheres in the presence of a lower alkanol containing from 1 to 8 carbon atoms inclusive, the improvement which comprises carrying out the hydrogenation under a partial pressure of ammonia, wherein the ratio of the pressure of ammonia to the total pressure is within the rane of 0.10 to 0.42, inclusive.

In a particular embodiment the invention also includes a semi-continuous process for the catalytic hydrogenation of di(4-aminophenyl)methane to di(4-aminocyclohexyl)methane using the same batch of supported rhodium catalyst a plurality of times before catalyst regeneration becomes necessary, subjecting the catalyst to a continuous flow of a gaseous atmosphere comprising oxygen and nitrogen at an elevated temperature for a time sufficient to regenerate its activity, and reusing said catalyst in a plurality of subsequent reductive cycles.

DETAILED DESCRIPTION OF THE INVENTION

The catalyst employed in the process of the invention is one containing elemental rhodium supported on any of the carriers conventionally employed for this purpose in preparing hydrogenation catalysts; see, for example, U.S. Pat. No. 3,591,635. Examples of such carriers are alumina, carbon, kieselguhr, bentonite, asbestos, silica gel, zirconium oxide and the like. The preferred carrier employed in the process of the invention is alumina.

The amount of elemental rhodium present in the catalyst employed in the process of the invention can vary from about 0.05 to about 40 percent by weight but is preferably within the range of about 0.5 to about 20 percent by weight. Most preferably the amount of elemental rhodium present in the catalyst is within the range of about 2 percent to about 10 percent by weight.

Since many of the supported rhodium catalysts employed in the process of the invention are readily available, in prepared form, from commercial sources the actual preparation of the catalyst as a preliminary step in the process can be avoided if desired. Details for the preparation of said catalysts are set forth in the aforesaid U.S. Pat. No. 3,591,635.

In carrying out the process of the invention the procedures commonly used in the art to carry out catalytic hydrogenations are employed, the novel feature being the use of an ammonia partial pressure during the hydrogenation of this particular diamine. The diamine can be employed in the form of the free base or in the form of an acid addition salt such as the dihydrochloride, sulfate, phosphate and the like. The hydrogenation is carried out in the presence of an inert solvent, i.e., a solvent for the diamine, free base or acid addition salt, which does not interfere in any way with the desired course of the hydrogenation. Preferably the solvent employed is a lower-alkanol, i.e., an alkanol containing from 1 to 8 carbon atoms, inclusive, such as methanol, ethanol, propanol, butanol, pentanol, hexanol, heptanol, octanol and isomeric forms thereof. Particularly preferred types of lower alkanols containing from 1 to 8 carbon atoms inclusive are those having a secondary or a tertiary hydroxyl group. Typical examples of such alcohols include; isopropyl alcohol, secondary butyl alcohol, 2-methyl-3-butanol, 3-pentanol, secondary amyl alcohol, 4-methyl-2-pentanol, tertiary butyl alcohol, tertiary amyl alcohol, 2-ethyl-2-butanol and the like. If desired, the alkanol can contain a minor proportion, up to about 50 percent by volume, of water. The most preferred solvent employed is advantageously one in which the starting diamine is sufficiently soluble to permit a concentration of starting diamine in the reaction mixture of about 5 percent to about 50 percent by weight. Preferably the concentration of starting diamine in the reaction mixture is from about 8 percent to about 25 percent by weight.

The hydrogenation catalyst is suspended in a solution of the starting diamine, in the form of free base or acid addition salt, and the resulting suspension is subjected to hydrogenation in an appropriate hydrogenation vessel under a partial pressure of ammonia. The amount of catalyst employed is such that the amount of rhodium present in the reaction mixture is within the range of about 0.1 percent to about 5 percent by weight based on the amount of starting diamine (calculated as free base) present in the reaction mixture. Preferably the quantity of catalyst employed is such that the amount of rhodium present in the reaction mixture is within the range of about 0.5 percent to about 2 percent by weight based on the amount of starting diamine (calculated as free base) employed.

Although the process of the invention has been described in its application to the hydrogenation using a suspended powdered form of catalyst, it is to be understood that it could also be performed using a catalyst bed packed with the catalyst in the form of pellets, granules, spheres, or other shapes known to those skilled in the art.

The hydrogenation is conducted at a temperature within the range of about 25°C to about 200°C and preferably within the range of about 50 C to about 150°C. The exact choice of temperature in any given instance is a function of the hydrogen pressure employed. The higher the pressure of hydrogen, the lower the temperature, within the above limits, which needs to be employed to attain an appropriate rate of hydrogenation.

The hydrogen pressure employed in the process of the invention can vary from about 1 atmosphere to about 100 atmospheres, but is preferably within the range of about 3 atmospheres to about 20 atmospheres. These pressures are substantially lower than those permissible with the prior art ruthenium catalyzed hydrogenation of di(4-amino-phenyl)methane.

The ammonia pressure employed in the process of the invention can vary from about 0.3 atmosphere to about 12 atmospheres, but is preferably within the range from about 0.5 atmosphere to about 8 atmospheres. The ratio of the pressure of ammonia to the total pressure should be within the range of 0.10 to 0.42, inclusive. In the absence of ammonia the catalyst life is severely limited. A further advantage to be found in the use of ammonia is the high conversion of di(4-aminophenyl)methane (MDA) to the desired di(4-aminocyclohexyl)methane ($H_{12}$MDA) and lower formation of undesirable high boiling residues. Yet a further advantage which flows from the use of ammonia is the facile regeneration of the rhodium catalyst, when such regeneration becomes necessary after a number of runs. This is due to the lower formation of high boiling residues on the catalyst surface. The regeneration procedure for a rhodium catalyst from a hydrogenation of MDA conducted in the absence of ammonia requires more rigorous conditions. The rhodium regeneration procedures will be discussed hereinbelow.

The progress of the hydrogenation is followed readily by observation of the amount of hydrogen taken up by the reaction mixture and the hydrogenation is terminated at the point at which the theoretical quantity of hydrogen has been absorbed. The catalyst is then separated from the solution of reduced material and the latter is treated, as by evaporation and like procedures followed by recrystallization and like purification procedures, to isolate the di(4-aminocyclohexyl)methane therefrom if desired.

It has now been found that the reduction of MDA to $H_{12}$MDA can be conveniently run on a semi-continuous basis by the use of ammonia as set forth hereinabove by reusing the rhodium catalyst a plurality of times. Then, when the catalyst shows signs of losing activity, e.g., longer hydrogenation times being required or lower conversion to $H_{12}$ MDA, it can be isolated and subjected to a regenerative step. The handling of the rhodium catalyst prior to regeneration is not critical, other than the normal precautions required when handling catalysts which become pyrophoric when in a completely dry state. In the non-continuous process the catalyst can be isolated by filtration from the reaction solution containing the $H_{12}$ MDA, washed with an appropriate solvent, preferably a solvent to be used in the reaction as set forth hereinabove, dried at about 60°C to about 100°C for about one hour before either being reused in a further reduction, or else treated to a regeneration step.

In the preferred embodiment of the invention of a semi-continuous process the rhodium catalyst never leaves the hydrogenation autoclave between runs except for regeneration, but remains under fresh reaction solvent to await the next cycle. When it is isolated for the purpose of regeneration, it is filtered and dried prior to the regeneration step. Whether it is completely solvent free, or completely free of organic residues is not critical to the regeneration procedure. Although it will be recognized by one skilled in the art that the cleaner the catalyst is prior to the regeneration step, the more rapidly and expeditiously this step will be accomplished.

Broadly speaking the rhodium catalyst can be regenerated easily by subjecting the isolated material to a continuous flow of an atmosphere of oxygen and nitrogen at an elevated temperature for a time sufficient to restore its activity. The regeneration apparatus is not limited to a specific type but may be any vessel which can contain the catalyst and allow the passage of a gaseous atmosphere through such vessel while being heated. Many types of apparatus can be used for this purpose, such as ovens, muffle furnaces, autoclaves, pipe furnaces, combustion furnaces, or any such apparatus known to one skilled in the art of catalyst regeneration. The oxygen content may vary from about 0.5 percent to about 21 percent depending on the regeneration temperature employed. One of the advantages to flow from the use of ammonia during hydro-genation of the MDA to $H_{12}$MDA is that it allows for a low temperature catalyst regeneration step. The temperature can range from about 200°C to about 250°C with an oxygen content of from about 0.5 percent to about 21 percent, for a time period of about 2 hours to about 24 hours but preferably from about 2 hours to about 8 hours. The oxygen content is not critical within the temperature range set forth above. Normally, the lower the oxygen content, the longer the regeneration time and vice versa. While the gaseous atmosphere can be a mixture of pure oxygen and pure nitrogen metered into the regeneration apparatus in the required ratio, the preferred method is to employ air which contains the maximum level of oxygen of 21 percent along with 78 percent nitrogen. When lower levels of oxygen are desired, nitrogen can be metered in from a separate source to mix with the air stream until the desired reduced oxygen level is attained. The flow rate of the gaseous atmosphere is in no way critical other than to supply fresh oxygen to the catalyst on a continuous basis. The flow rate can vary from 3 c.c./min./c.c. catalyst to 20 c.c./min./c.c. catalyst at room temperature and atmospheric pressure.

If the rhodium catalyst becomes overheated through improper control of reaction exotherm, then a higher temperature regenerative process is required. Said higher temperature process is also required if the catalyst suffers degeneration for any other reason, but more particularly, due to handling procedures other than those taught in the present invention. This higher temperature process ranges from about 300 C to about 450 C, under an air-nitrogen atmosphere where oxygen content is from about 0.5 percent to about 5 percent for a time period of about 2 hours to about 6 hours. Oxygen content is critical in this higher temperature process and therefore requires the low range set forth above. If the oxygen content exceeds the upper limit, there is a tendency toward lowering of catalyst activity.

In summarizing the rhodium catalyst regeneration, two methods are available. The first is a low temperature, less stringent process which can be used when ammonia is present during the semi-continuous hydrogenation of MDA which is the preferred exemplification of our invention. The second is a higher temperature process which is employed when the catalyst becomes contaminated or deactivated either through unavoidable experimental conditions, or through treatment of the catalyst not consistent with the best mode contemplated by the invention.

The di(4-aminocyclohexyl)methane obtained in accordance with the process of this invention is useful for all purposes for which this material is conventionally used in the art; see U.S. Pat. No. 2,494,563. Further, said di(4-aminocyclohexyl)methane produced in accordance with the process of the invention is a mixture of cis,cis-isomer, cis,trans-isomer, and trans,trans-isomer which can be separated into its individual components by procedures well-known in the art; see, for example, U.S. Pat. No. 2,494,563, supra.

Although the process of the invention has been described in its application to the hydrogenation of substantially pure di(4-aminophenyl)methane, it is to be understood that it can be applied to mixtures of polyamines which contain the diamine as principal component, the other components of the mixture being triamines, tetramines and higher polymeric methylene bridged polyphenyl polyamines and isomeric diamines. Such mixtures are generally obtained by the acid condensation of aniline and formaldehyde; see, for example, U.S. Pats. No. 3,260,751, 2,683,730, and 2,950,263. The product obtained in such a hydrogenation is the desired di(4-aminocyclohexyl)methane in admixture with the corresponding fully hydrogenated higher polyamines or isomeric diamines.

The following examples describe the manner and process of making and using the invention and set forth the best mode contemplated by the inventors of carrying out the invention but are not to be construed as limiting.

EXAMPLE 1

This example shows a comparison of a series of hydrogenations conducted under hydrogen pressure alone with a series conducted under hydrogen along with a partial pressure of ammonia.

A 500 ml. Parr bottle was charged with 20 g. (0.1009 mole) of di(4-aminophenyl)methane [MDA], 200 ml. of isopropyl alcohol, and 6.0 g. of 5 percent rhodium-on-alumina catalyst (Engelhard Industries). The bottle was closed with a rubber stopper fitted with a ¼ inch tubing for a Conax thermocouple and gas inlet, then placed on the heated shaker of a Parr hydrogenation apparatus equipped with a 4 liter tank. The free space above the charge was purged three times each with nitrogen followed by hydrogen. The whole system (bottle and tank) was pressured to 60 p.s.i.g. with hydrogen. After a pressure check, the shaker and heater were started. Hydrogen pressure was maintained by periodically adding more hydrogen and pressure was not allowed to drop below 45 p.s.i.g. The temperature was maintained at 70° – 75°C for the duration of the reduction. At the completion of the reduction, the reaction mixture was cooled, vented and discharged from the bottle. The catalyst was removed by filtration, washed with isopropyl alcohol and then dried at 90°C for 1 hour before being reused in an exact replica (Run 2) of the procedure described above (Run 1).

The filtrate and isopropanol washings were stripped of solvent using a rotary flash evaporator under vacuum which removed the major portion of isopropanol. The residue was distilled through a micro Vigreux column under 0.1 – 0.2 mm. of vacuum. A fore-cut consisting of isopropyl alcohol was discarded while the main cut, consisting of a mixture of di(4-aminocyclohexyl)methane ($H_{12}$ MDA) and 4-aminocyclohexyl-4-aminophenyl methane ($H_6$MDA), was collected and analyzed by vapor phase chromatography and shown to be only $H_{12}$ MDA and $H_6$MDA. The residue remained in the still-pot.

The catalyst from the second run (Run 2) was recovered and used in a third run (Run 3) and the analyses, including residue percentages from Runs 1 – 3, are set forth in Table I. Percent residue was calculated by dividing the distillation residue (in grams) by MDA reacted (in grams). $H_{12}$ MDA and $H_6$MDA conversions were calculated by dividing the respective quantities of $H_{12}$ MDA and $H_6$MDA (in moles) by MDA charged (in moles).

The series of hydrogenations of MDA samples was repeated starting with 6 g. of fresh rhodium-on-alumina catalyst as Runs 4 – 6, the only variation being the pressurization of the Parr bottle to 15 p.s.i.g. with ammonia first and then to 75 p.s.i.g. with hydrogen. The remainder of the procedure was identical to Runs 1 – 3 above only the pressure was not allowed to drop below 60 p.s.i.g. The results are set forth in Table I.

TABLE I

| Run No. | Catalyst Recycle | NH₃ (psig) | Reaction Time (hrs.) | Conversion H₁₂MDA | (%) H₆MDA | Residue (%) |
|---|---|---|---|---|---|---|
| 1 | Fresh | 0 | 12 | 88.1 | 6.9 | 5.0 |
| 2 | 1 | 0 | 24 | — | — | — |
| 3 | 2 | 0 | 24 | 79.3 | 6.6 | 14.0 |
| 4 | Fresh | 15 | 12 | 95.2 | 5.3 | 1.5 |
| 5 | 1 | 15 | 20 | 89.6 | 9.0 | 3.5 |
| 6 | 2 | 15 | 23 | 79.7 | 16.8 | 3.3 |

EXAMPLE 2

This example demonstrates the regeneration procedure necessary to reactivate the 5 percent rhodium-on-alumina catalyst when a series of semi-continuous hydrogenations have been carried out under a partial pressure of ammonia using recycled catalyst. The data was obtained from two separate runs.

Using the procedure described in Example 1 in which 15 p.s.i.g. partial pressure of ammonia as well as the 75 p.s.i.g. of hydrogen was charged to the Parr bottle, a series of hydrogenations of MDA were carried out. The 6.0 g. of 5 percent rhodium-on-alumina was recycled after washing with fresh isopropanol and drying as described in Example 1 and regenerated as indicated. The results are set forth in Table II.

EXAMPLE 3

This example demonstrates the more stringent regeneration procedure necessary to reactivate the 5 percent rhodium-on-alumina catalyst when a series of semi-continuous hydrogenations are carried out in the presence of ammonia but catalyst activity has been degraded by the factors indicated below.

Using the procedure described in Example 1 in which 15 p.s.i.g. of ammonia was first charged to the Parr bottle followed by 75 p.s.i.g. of hydrogen, a series of hydrogenations of MDA were carried out. The 5 percent rhodium-on-alumina catalyst was recovered, washed with isopropanol, except where indicated, dried according to Example 1 and recycled. Catalyst regeneration was performed as indicated. The results are set forth in Table III.

TABLE III

| Run No. | Catalyst Recycle | Reaction Time (hrs.) | Conversion H₁₂MDA | (%) H₆MDA | Residue (%) | Regeneration Method |
|---|---|---|---|---|---|---|
| P-43 | 20 | 24 | 70.1 | 17.5 | 3.0 | — |
| P-45 | 21* | 24 | 37.5 | 57.1 | 2.0 | — |
| P-47 | 22* | 24 | 21.3 | 71.6 | 3.1 | — |
| P-50 | 23 | 24 | 97.4 | 4.4 | 2.0 | E** |
| P-51 | 24 | 24 | 96.5 | 2.5 | 1.5 | — |
| P-52 | 24 | 24 | 88.3 | 9.6 | 1.5 | — |
| L-5*** | 4 | 24 | 69.8 | 27.5 | 1.5 | F** |

*Catalyst activity poisoned by washing with tetrahydrofuran.
**Regeneration performed before the particular run was made.
E: 400 – 440°C, 2 – 5% O₂ with nitrogen, 178 c.c./min., 2 hrs.
F: 310 – 350°C, 1.8% O₂ with nitrogen, 80 c.c./min., 3 hrs.
***From another series of runs in which catalyst activity was degraded by long standing on the shelf. The regeneration temperature was not high enough to restore the catalyst to normal activity.

TABLE II

| Run No. | Catalyst Recycle | Reaction Time (hrs.) | Conversion H₁₂MDA | (%) H₆MDA | Residue (%) | Regeneration Method |
|---|---|---|---|---|---|---|
| L-4 | 3* | 24 | 50.5 | 44.6 | 4.0 | — |
| L-5 | 4 | 24 | 69.8 | 27.5 | 1.5 | A** |
| L-6 | 5 | 24 | 11.1 | 73.3 | 2.2 | — |
| L-7 | 6 | 24 | 81.6 | 12.2 | 2.5 | B** |
| A-1 | Fresh | 16 | 84.2 | 5.1 | 2.5 | — |
| A-2 | 1 | 24 | 7.7 | 62.4 | 5.9 | — |
| A-3 | 2 | 24 | — | — | — | C** |
| A-4 | 3 | 24 | 54.8 | 41.6 | 2.0 | — |
| A-5 | 4 | 16 | 84.7 | 8.6 | 3.0 | D** |

*Third recycle from a previous reduction conducted under 15 p.s.i.g. ammonia.
**Regeneration performed before the particular run was made.
A: 310 – 350°C, 1.8% O₂ with nitrogen, gas rate = 80 c.c./min., 3 hrs.
B: 200 – 210°C, 21% O₂ with nitrogen (full air), gas rate = 32 c.c./min., 3 1/2 hrs.
C: 300 – 320°C, 1.8% O₂ with nitrogen, gas rate = 80 c.c./min., 2 hrs.
D: 200 – 240°C, 21% O₂ with nitrogen (full air), gas rate = 33 c.c./min., 5 hrs.

Regeneration procedure: Regenerator is a 316 stainless steel cylinder, 1¾ inch high and 2½ inch diameter, fitted with a porous filter disk at the bottom having a gas inlet tube beneath the disc. It was heated by a fluidized sand bath, Model SBL2, Techne Ltd. (Distributor: Cole-Parmer). Catalyst placed on disc was subjected to the appropriate conditions called for in A to D and in every case a second step consisting of hydrogen gas at 300 – 400°C for 2 hours.

Regeneration procedure: same as that outlined in footnote to Table II including treatment of regenerated catalyst with hydrogen at 300° – 400°C.

EXAMPLE 4

This example shows a series of hydrogenations conducted on a pilot plant scale using the same catalyst for at least eighty reductions where catalyst regeneration was not required until the forty-sixth cycle and then every six to nine cycles thereafter.

A one gallon stainless steel autoclave (Autoclave Engineers, Inc.) equipped with an agitator (Packless Magnedrive), heat transfer coil, heating mantle and a 231 cubic inch hydrogen tank, was charged with 200 g. (1.009 moles) of twice distilled di(4-aminophenyl)methane (MDA) dissolved in 1,560 g. of isopropanol and 60 g. of 5 percent rhodium-on-alumina catalyst (Engelhard Industries). The autoclave was purged three times each with nitrogen followed by hydrogen. It was evacuated and then pressured with ammonia to a range of 19 to 100 p.s.i.g. but usually to 80 p.s.i.g. Finally it was pressured with hydrogen to a total pressure of 190 p.s.i.g. Following a pressure check, agitation and heating (by steam) of the autoclave was initiated. A hydrogen pressure regulator maintained the autoclave pressure. The reduction temperature was 250°F for all eighty cycles and normally it took 7 - 10 minutes to reach the operating temperature. When necessary, the autoclave was cooled with water to maintain the 250°F level. Upon completion of reaction, the autoclave was cooled before discharging the reaction solution with nitrogen pressure. The catalyst remaining at the bottom of the autoclave was washed with approximately 1,600 ml. of isopropanol at 150°F for 15 minutes twice to remove any residual product adhering to the catalyst. Then 1,600 ml. of recycled IPA was added to the autoclave, and pressured to about 50 p.s.i.g. of nitrogen to await the next cycle. When catalyst regeneration was necessary, it was isolated by filtration, washed with fresh isopropanol, dried at 90°C and then subjected to the regenerative steps so indicated.

The reaction product was combined with the wash IPA liquor and subjected to a long-tube evaporation to remove IPA. The residue containing $H_{12}$ MDA plus a small amount of $H_6$MDA was distilled using a 1 plate entrainment separator column to recover these components. The distillation was stopped when the bottoms temperature reached 280°C at 0.4 mm. Hg. abs. The percent residue was calculated by dividing the weight of distillation residue (in grams) by the MDA reacted (in grams). $H_{12}$ MDA conversion was calculated by dividing the $H_{12}$ MDA recovered (in moles) by MDA charged (in moles). The analyses of the reaction products were performed by vapor phase chromatography using a Varian Model 1720-1 gas chromatograph. The results are set forth in Table IV showing only a representative number of the runs for the sake of brevity. At the end of the eightieth run, 83 percent of the catalyst weight remained.

Catalyst regeneration procedure is the same as that outlined in footnote to Table II except no post treatment with hydrogen was employed.

We claim:

1. In a process for the catalytic hydrogenation of di(4-aminophenyl)methane to di(4-aminocyclohexyl)methane at a temperature from about 25°C to about 200°C in the presence of a supported rhodium catalyst under a hydrogen pressure of from about 3 atmospheres to about 20 atmospheres in the presence of a lower alkanol containing from 1 to 8 carbon atoms inclusive, the improvement which comprises carrying out the hydrogenation under a partial pressure of ammonia, wherein the ratio of the pressure of ammonia to the total pressure is within the range of 0.10 to 0.42 inclusive.

2. The process of claim 1 wherein the partial pressure of ammonia is from about 0.5 atmosphere to about 8 atmospheres.

3. The process of claim 1 wherein the supported rhodium catalyst is a rhodium-on-alumina catalyst wherein the rhodium content is from about 0.5 percent to about 20 percent by weight.

4. The process of claim 1 wherein the lower alkanol is selected from the group consisting of secondary and tertiary alkanols.

5. A semicontinuous process for the catalytic hydrogenation of di(4-aminophenyl)methane to di(4-aminocyclohexyl) methane which process comprises hydrogenating di(4-aminophenyl)-methane at a temperature from about 25°C to about 200°C in the presence of a supported rhodium catalyst, a lower alkanol containing from 1 to 8 carbon atoms inclusive, hydrogen under pressure of from about 3 atmospheres to about 20 atmospheres, and a partial pressure of ammonia, wherein the ratio of the pressure of ammonia to the total pressure is within the range of 0.10 to 0.42 inclusive, separating the catalyst from the resultant solution of di(4-aminocyclohexyl)methane remaining after a

TABLE IV

| Run No. | Catalyst Recycle | Reaction Time (min.) | Residue (%) | $H_6$MDA on Residue Free Basis (%) | Regeneration No.* |
|---|---|---|---|---|---|
| 45 | 45 | 120 | — | 22.0 | 0 |
| 46 | 46 | 50 | 10.4 | 0.5 | 1** |
| 49 | 49 | 120 | — | 20.7 | 1 |
| 52 | 52 | 33 | 4.5 | 3.1 | 2** |
| 55 | 55 | 90 | 10.0 | 6.9 | 2 |
| 58 | 58 | 120 | 8.2 | 49.2 | 2 |
| 59 | 59 | 45 | — | 5.0 | 3*** |
| 64 | 64 | 105 | 13.2 | 7.3 | 3 |
| 66 | 66 | 120 | — | 11.1 | 3 |
| 67 | 67 | 40 | 4.0 | 4.8 | 4 |
| 70 | 70 | 60 | 5.9 | 8.1 | 4 |
| 73 | 73 | 80 | 9.3 | 8.5 | 4 |
| 75 | 75 | 85 | — | 15.0 | 4 |
| 76 | 76 | 25 | 6.5 | 4.6 | 5 |
| 80 | 80 | 65 | — | 7.8 | 5 |

*Regeneration performed before the particular run was made.
**Catalyst regenerated: 220°C, 2% $O_2$ with nitrogen, gas rate = 200 c.c./min., 12 hrs.
***Catalyst regenerated: 220°C, 21% $O_2$ with nitrogen (full air), gas rate = 200 c.c./min., 22 hrs.

plurality of reductive cycles as recited hereinabove, subjecting the separated catalyst to a continuous flow of a gaseous atmosphere comprising from about 0.5 to about 21 percent by volume of oxygen and nitrogen at a temperature from about 200°C to about 250°C for a period of about 2 hours to about 24 hours, and reusing said catalyst in a plurality of subsequent hydrogenations of di(4-aminophenyl)methane.

6. The process of claim 6 wherein the lower alkanol is selected from the group consisting of secondary and tertiary alkanols.

7. The process of claim 6 wherein the partial pressure of ammonia is from about 0.5 atmosphere to about 8 atmospheres.

8. The process of claim 6 wherein the supported rhodium catalyst is a rhodium-on-alumina catalyst wherein the rhodium content is from about 0.5 percent to about 20 percent by weight.

9. A semicontinuous process for the catalytic hydrogenation of di(4-aminophenyl)methane to di(4-aminocyclohexyl)methane which process comprises hydrogenating di(4-aminophenyl)methane at a temperature from about 25°C to about 200°C in the presence of a supported rhodium catalyst, a lower alkanol containing from 1 to 8 carbon atoms inclusive, hydrogen under pressure of from about 3 atmospheres to about 20 atmospheres, and a partial pressure of ammonia, wherein the ratio of the pressure of ammonia to the total pressure is within the range of 0.10 to 0.42 inclusive, separating the catalyst from the resultant solution of di(4-aminocyclohexyl)methane remaining after a plurality of reductive cycles as recited hereinabove, subjecting the separated catalyst to a continuous flow of a gaseous atmosphere comprising from about 0.5 to about 5 percent by volume of oxygen and nitrogen at a temperature from about 300°C to about 450°C for a period of about 2 hours to about 6 hours, and reusing said catalyst in a plurality of subsequent hydrogenations of di(4-aminophenyl)-methane.

* * * * *